Patented July 4, 1950

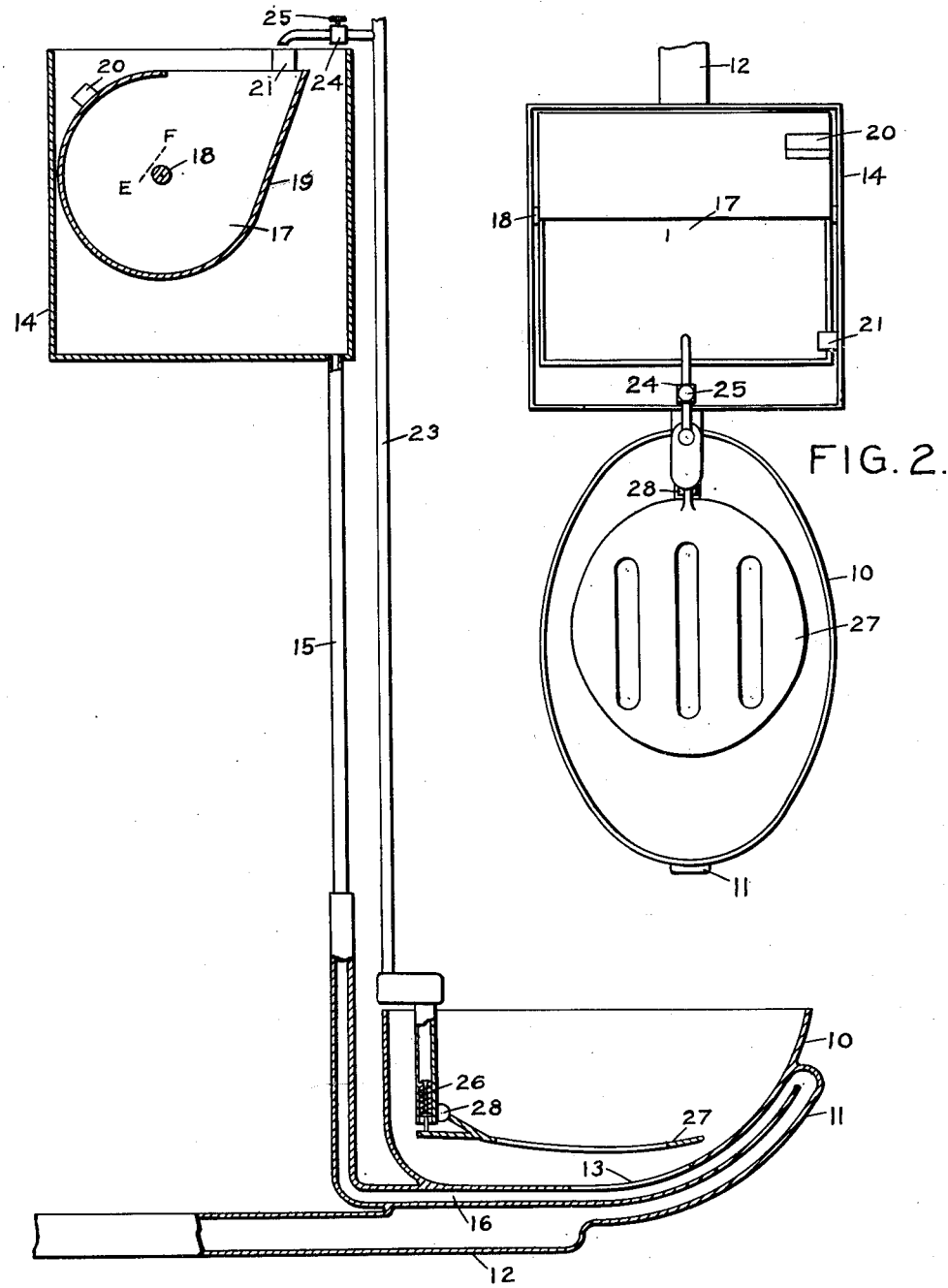

2,513,753

UNITED STATES PATENT OFFICE 2,513,753

SELF-CLEANING DRINKING BOWL FOR ANIMALS

Walter H. Sheldon, East Lansing, Mich., assignor to Michigan State Board of Agriculture, East Lansing, Mich., a corporation of Michigan Application April 28, 1949, Serial No. 90,115

5 Claims. (Cl. 119—72)

The present invention is a drinking bowl for animals which is cleaned periodically by means of an automatic flushing apparatus. Briefly the invention comprises a bowl having a flushing siphon connected therewith, the siphon communicating with a drain to carry away the water flushed from the bowl to a point remote therefrom. A flush tank is connected to the bowl and in the flush tank is pivotally mounted a rocking receptacle adapted to be slowly filled with water, and when filled to discharge its contents into the flush tank from whence it flows to the bowl. A drinking water supply is connected to the bowl by a conduit having a control valve actuated by the animal when drinking, thereby maintaining an adequate supply of clean water in the bowl at all times.

The invention is illustrated in the accompanying drawings, wherein:

Figure 1 is a plan view of the invention; and

Figure 2 is a cross-sectional view taken on substantially the line 2—2 of Figure 1.

The invention comprises a drinking bowl 10 having a siphon trap 11 in the form of a reversely bent conduit beneath the bowl. The siphon 11 is connected at one end to a drain pipe 12. The other end of the siphon 11 communicates with the interior of the bowl through a relatively large opening 13.

A flush tank 14, which may take any one of a number of forms, is mounted on a suitable support at a level above the bowl. The flush tank is connected by a pipe 15 to a conduit 16 preferably formed as a part of the bowl. The conduit 16 is in the form of a tubular passageway communicating with the opening 13 and preferably aligned with the inlet end of the siphon 11.

A water receptacle 17 is located within the flush tank. The receptacle is provided with one side inclined as at 19. The receptacle 17 is pivotally mounted within the flush tank on pivots 18. The pivot is arranged slightly off center away from the inclined side and the opposite side of the receptacle is weighted, as by weight 20, so that the center of gravity of the receptacle when empty is approximately at the point E, or slightly to the left of the pivot 18, as viewed in Figure 2. The receptacle then assumes the position shown in full lines. A stop 21 mounted on the flush tank holds the receptacle against counter-clockwise movement.

Because the side 19 is inclined, as the receptacle is filled with water, the center of gravity shifts along the line E—F to the point F. The latter point is slightly to the right of the pivot whereby the receptacle tilts in a clockwise direction, discharging its contents into the flush tank, from which it flows through pipe 15 to the bowl 10.

Water is supplied to the receptacle continuously from a supply pipe 23 and faucet 24. The faucet is provided with a valve having a handle 25 by means of which the flow of water and consequent rapidity of dumping of the receptacle may be regulated.

The pipe 23 also supplies clean drinking water to the bowl 10. The lower end of the pipe 23 extends well down into the bowl and is provided with a valve 26 of the poppet type having a downwardly extending stem. A coil spring 29 biases the valve toward closed position. The valve 26 is opened by a lever 27 pivotally connected to a lug 28 on the pipe 23. The lever 27 is in the form of a relatively large plate. The lever 27 is depressed by the muzzle of an animal while drinking, thereby maintaining a supply of water in the bowl. The high water level is determined by the siphon trap 11 so that the bowl will not overflow onto the ground immediately adjacent to the bowl. Excessive water will flow out of the drain 12.

The drinking bowl described will be kept free of dirt and debris by the flushing action of the flush tank 14 and receptacle 17. The valve in the faucet 24 is adjusted to furnish a continuous stream of water to the receptacle, which upon becoming filled will dump and discharge its contents into the pipe 15. Some of the water rushing through conduit 16 is forced into the siphon trap 11 while the rest flows into the bowl through the opening 13 where it agitates the water already in the bowl and any refuse therein. The siphon then draws out most of the water from the bowl, leaving that remaining at least relatively clean. After the receptacle 17 has emptied itself it returns to its previous position to be refilled.

The rapidity of dumping can be easily regulated by adjusting the valve handle 25.

It will be seen that the present invention provides a drinking bowl which will automatically be maintained in a clean, usable condition at all times. It is simple and easily manufactured. An adequate but not excessive supply of water will be maintained in the bowl by the animal drinking therefrom.

The scope of the invention is indicated in the appended claims.

I claim:

1. A self cleaning drinking bowl for animals comprising a bowl having a siphon communicating at its inlet end with the bowl adjacent the bottom thereof, a flush tank, a duct connecting said flush tank to said bowl adjacent the inlet end of the siphon, a water supply source connected to said flush tank, and a water supply source connected to said bowl.

2. A self cleaning drinking bowl for animals comprising a bowl having a siphon communicating at its inlet end with said bowl adjacent the bottom thereof, a flush tank, a duct connecting said flush tank to said bowl adjacent the inlet end of said siphon, means associated with said flush tank for periodically discharging a predetermined quantity of water into said flush tank, and a water supply source connected to said bowl.

3. A self cleaning drinking bowl of the character defined in claim 2, wherein said means comprises a tilting receptacle for water pivotally mounted on said flush tank.

4. A self cleaning drinking bowl of the character defined in claim 2 wherein said means comprises a tilting receptacle for water pivotally mounted on said flush tank, said receptacle being so constructed that the center of gravity of the empty receptacle is displaced from that of the receptacle when partially filled, and said pivotal mounting is located intermediate said center of gravity.

5. A self cleaning drinking bowl of the character defined in claim 2 wherein said second named water supply source is provided with a valve having a pivoted lever for opening said valve, said lever being of less specific gravity than water and being located within said bowl in a position to be depressed by the muzzle of an animal when drinking.

WALTER H. SHELDON.

REFERENCES CITED

The following references are of record in the file of this patent:

UNITED STATES PATENTS

| Number | Name | Date |
|---|---|---|
| 228,264 | McFarland | June 1, 1880 |
| 1,417,688 | Rassmann | May 30, 1922 |
| 2,212,538 | Groeniger | Aug. 17, 1940 |
| 2,292,020 | Venolia | Aug. 4, 1942 |